UNITED STATES PATENT OFFICE.

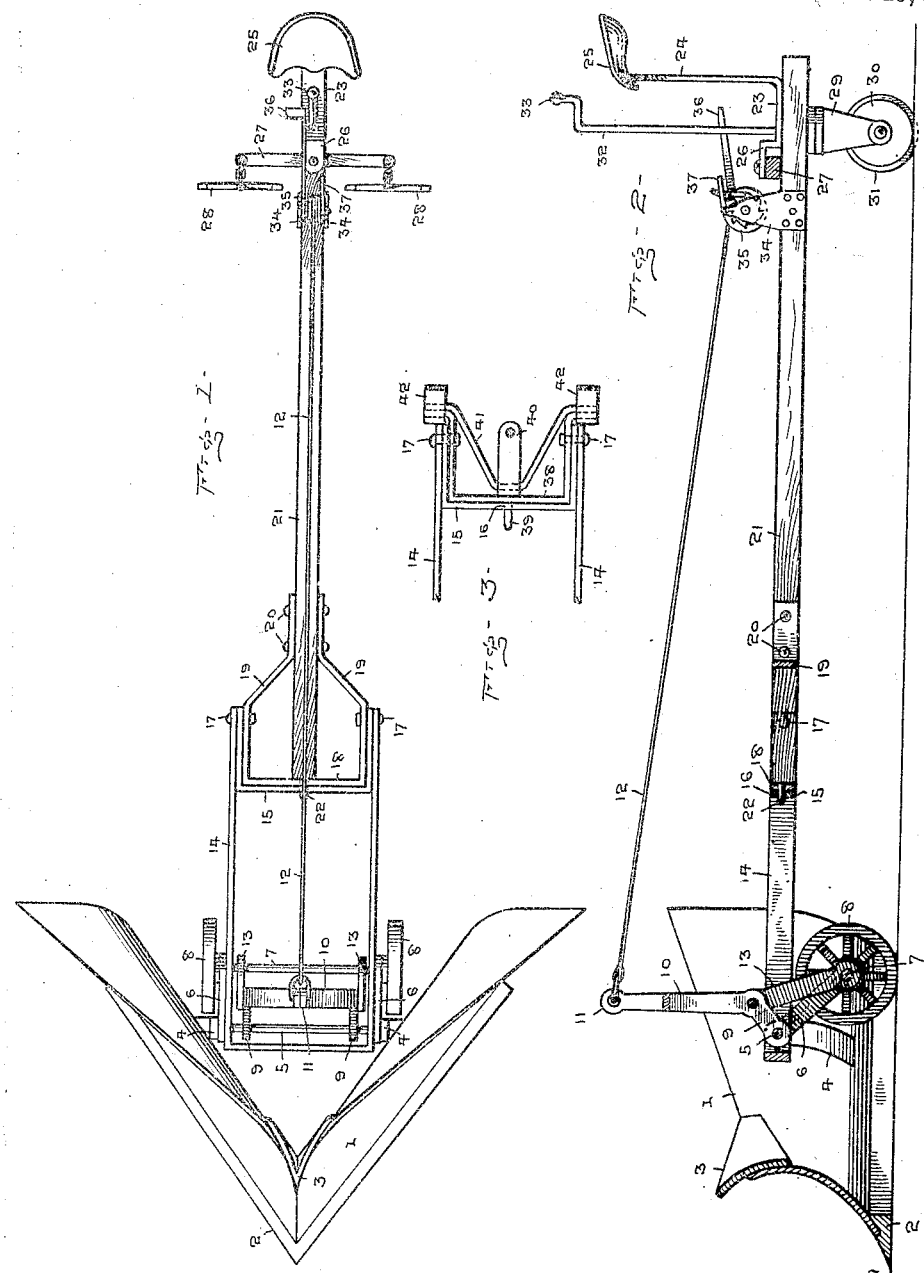
A. H. TALLYN.
SNOW PLOW.
APPLICATION FILED APR. 24, 1916.
1,230,622.
Patented June 19, 1917.
Inventor
Arthur H. Tallyn
By W. J. FitzGerald
Attorneys

ARTHUR H. TALLYN, OF BENSON, ILLINOIS.

SNOW-PLOW.

1,230,622.  Specification of Letters Patent. Patented June 19, 1917.

Application filed April 24, 1916. Serial No. 93,232.

*To all whom it may concern:*

Be it known that I, ARTHUR H. TALLYN, a citizen of the United States, residing at Benson, in the county of Woodford and State of Illinois, have invented certain new and useful Improvements in Snow-Plows; and I do hereby declare the following to be a full, clear, and exact description of the invention, such as will enable others skilled in the art to which it appertains to make and use the same.

My invention relates to snow plows, for removing snow from railroad tracks, highways, side walks, paths, etc.

An object of my invention is the provision of means for readily converting the plow from a horse driven plow to a traction driven plow and vice versa.

Another object of my invention is the provision of a wheel frame for the plow, and means for adjusting the plow relative to the wheel frame.

A further object of my invention is the provision of means for raising and lowering the plow when desired.

And a still further object of my invention is the provision of supporting wheels for the plow whereby the same may be readily transported over the ground.

These and other objects will more fully appear as the nature of the invention is more clearly understood from the following specification, the subject matter of the claims, and the views illustrated in the accompanying drawings, in which, Figure 1 is a top view of the plow, showing the same provided with means for operating the plow by horse power.

Fig. 2 is a side view, partly in section, of the construction shown in Fig. 1.

Fig. 3 is a top view of an attachment for the plow for attaching the plow to the front end of a tractor when it is desirous of operating the plow with a tractor in lieu of horse power.

Referring to Figs. 1 and 2 of the drawings, 1 denotes a substantially V-shaped double winged snow plow, having suitably seated along the bottom edges of its wings and suitably secured thereto the share or wear strip 2 provided with a sharp forward edge, and suitably secured at the crest or upper meeting points of the wings of the plow is the substantially V-shaped knife member 3 projecting for a distance above the upper edges of the wings of the plow and provided for slicing any crust which may have formed upon the snow, and so constructed as to prevent the broken cakes of the crust from falling over behind the plow.

Suitably secured to the rear sides of the wings of the plow are the standards 4, having secured in their upper ends the shaft 5, and depending downwardly from the shaft 5 adjacent the standards 4 are the links 6, having mounted in their lower ends the axle 7, upon the outer ends of which are mounted the transporting wheels 8. Pivotally mounted upon the shaft 5 are the forwardly extending arms 9 of the yoke shaped lever 10, provided with a centrally disposed operating arm 11, in the upper end of which is secured the cable or other suitable connecting means 12, and connected to the legs of the yoke shaped lever 10, at its juncture with the arms 9, are the links 13, having their lower ends pivotally connected to the axle 7, whereby through the medium of the standards 4, upon the wings of the plow, the shaft 5 secured in the upper ends of the standards 4, the links 6 connecting the shaft 5 and the axle 7 of the wheels 8, the yoke shaped lever 10 pivotally connected to the shaft 5 through the medium of its forwardly extending arms 9, and the links 13 connecting the yoke shaped lever 10 to the axle 7 of the wheels 8, the plow is connected with the wheels 8 in a manner so that the plow may be elevated and supported upon the wheels 8 by the rearward movement of the yoke shaped lever 10 by the pull exerted upon the operating arm 11 by the cable 12, further operation of which will be hereinafter described.

Pivotally mounted at its forward end upon the shaft 5 is the substantially rectangular main frame 14, provided at its rear end with the substantially U-shaped reinforcing frame 15 suitably secured therein, the reinforcing frame 15 being provided with the centrally disposed aperture 16 as shown in Figs. 2 and 3.

Within the rear end of the main frame 14 and within its reinforcing frame 15 through the medium of the bolts 17 is mounted the frame 18, having its converging arms 19 secured as at 20 upon the end of the tongue 21, and to prevent pivotal movement of the frame 18 upon the bolts 17, the frame 18 is provided with the centrally disposed pin 22 projected through the aperture 16 of the reinforcing frame 15 of the main frame 14, whereby the forward end of the tongue 21 is securely attached to the main frame 14 of the plow.

Secured upon the tongue 21 adjacent its rear end is the base 23 of the seat post 24 upon the upper end of which is the seat 25 for the operator of the plow; the forward end of the base 23 of the seat post 24 is formed to provide the bracket 26, between which and the upper surface of the tongue 21, and suitably secured therein is the double bar 27, to the ends of which are secured the swingletrees 28 to which the traces of the horses are attached.

For supporting the rear end of the tongue 21 there is mounted upon its under side the swivel post 29, having revolubly mounted in its lower end the guide wheel 30 provided with the sharp periphery 31 provided to adapt the guide wheel 30 to cut into the ice or frozen ground beneath the snow to thereby obviate the danger of skidding of the guide wheel 30, and for operating the guide wheel 30 for guiding the snow plow, the shaft 32, having its lower end suitably secured to the swivel post 29, is provided, and for rotating the shaft 32 for guiding the guide wheel 30, the shaft 32 is provided at its upper end with the crank 33 positioned within convenient reach of the operator.

Secured upon the tongue 21 in proximity to its rear end, are the brackets 34, in the upper ends of which is revolubly mounted the drum 35 to which is attached one end of the cable 12, which is adapted to have one end portion thereof wound upon the drum 35, and for rotating the drum 35 for winding the end of the cable 12 thereon, the foot lever 36 is provided and having a suitable pawl and ratchet connection with the drum 35, and for retaining the drum 35 in its rotated positions for maintaining the end of the cable 12 wound thereon or for releasing the drum 35 for paying out the cable 12 the locking and releasing lever 37 is provided having also suitable pawl and ratchet connection with the drum 35, and which retaining and releasing lever 37 may also be operated by the foot of the person operating the snow plow.

When it is desirous of operating the snow plow with any suitable form of tractor in lieu of horse power, the tongue 21 and its accessories are removed from the main frame 14 of the snow plow by removing the bolts 17 for detaching the frame 18 of the tongue 21 from the main frame 14 and substituting therefor the frame 38 having its side members connected to the main frame 14 and its reinforcing frame 15 through the medium of the bolts 17, the frame 38 being provided with the centrally disposed pin 39 projected through the aperture 16 of the reinforcing frame 15 of the main frame 14 in the same manner and for the same purpose that the pin 22 of the frame 18 of the tongue 21 is employed, the frame 38 is further provided with the clevis 40 adapted to be secured in any suitable manner to the front end of a tractor, and upon the out-turned ends of the side members of the frame 38 and the out-turned ends of its bracing member 41, are secured the substantially U-shape yokes 42 designed to embrace the forward portions of the frame of the tractor for supporting the rear end of the main frame 14 of the plow, the connection between the tractor and the clevis 40 of the frame 38 prevents the yokes 42 from becoming disengaged from the frame of the tractor, and in this instance the brackets 34, for supporting the drum 35 and the operating levers 36 and 37, may be removed from the tongue 21 and positioned at any suitable point upon the tractor whereby to operate the drum 35 and the cable 12.

The operation of the foregoing described snow plow, whether propelled by horse power or traction power, will be clearly understood by assuming that the plow which has been transported in elevated position upon the wheels 8 occasioned by the lever 10 being swung rearwardly by the cable 12 when suitably wound upon the drum 35, is now at its point of operation with the share 2 of the plow resting upon the ground and the lever 10 in its forward position due to the paying out of the cable 12 by the drum 35 upon being released by the releasing lever 37, these parts being shown in their respective operative positions in the drawings. The plow is now ready to be propelled along the center of the highway or street, and is of sufficient width to remove the snow from the highway or street and force the same to each side thereof, the plow being of sufficient depth and size to meet the exigencies of the case, and by the employment of the knife member 3 any crust which may have formed upon the top of the snow will be sliced and broken up so that the crust will not pass over the upper edge of the plow and fall therebehind.

Having described my invention, what I claim as new and desire to secure by Letters Patent, is:—

1. A snow plow comprising a plow, a pair of standards carried by said plow, a shaft secured to and supported by said standards, a main frame pivotally mounted at its forward end upon said shaft, means for supporting the opposite end of said main frame, an operating lever pivotally mounted upon said shaft, a wheeled axle disposed below said main frame, links connecting said axle with the transverse shaft and with said operating lever, and means for actuating said lever to raise and lower the plow.

2. A snow plow comprising a plow, standards fixed at the lower ends to said plow, a transverse shaft having its opposite ends secured to and supported by said standards, a main frame pivotally mounted at its forward end upon said shaft, means for supporting the rear end of the main frame, a wheeled axle disposed below the main frame, links pivotally connected at their opposite ends to the axle and transverse shaft, a vertically disposed yoke shaped lever pivotally mounted upon the transverse shaft, links connected to the said lever and the axle, and means carried by the main frame and operatively connected to said lever adapted to be actuated to raise and lower the plow.

3. A snow plow comprising an open ended main frame, a wheeled axle attached to and adapted to support the front end of the frame, a plow attached to said frame, a reinforcing frame mounted within the open end of said main frame and fixed thereto, a tongue, a frame carried by the tongue and detachably mounted within said reinforcing frame, means for holding the reinforcing frame in fixed relation to the main frame, and means carried by the tongue and connected to the plow for raising and lowering the plow.

4. A snow plow comprising an open ended main frame, a wheeled axle attached to and adapted to support the front end of the frame, a plow attached to said frame, a reinforcing frame mounted within the open end of said main frame and rigid therewith, a tongue, a frame carried by the tongue detachably mounted within said reinforcing frame, a coupling pin carried by the forward end portion of the tongue and extending through the tongue frame and through said reinforcing frame, said pin serving to hold the tongue frame rigid with said reinforcing frame, and means carried by the tongue and connected to the plow for raising and lowering the plow.

In testimony whereof I have signed my name to this specification in the presence of two subscribing witnesses.

ARTHUR H. TALLYN.

Witnesses:
F. N. TALLYN,
F. C. TUCKER.